(12) United States Patent
O'Brien (10) Patent No.: US 11,096,331 B2
(45) Date of Patent: Aug. 24, 2021

(54) BALE WRAP REMOVAL DEVICE UTILIZING SHAPE MEMORY WIRE

(71) Applicant: DEERE & COMPANY, Moline, IL (US)

(72) Inventor: Stephen E. O'Brien, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 204 days.

(21) Appl. No.: 16/539,033

(22) Filed: Aug. 13, 2019

(65) Prior Publication Data
US 2021/0045291 A1  Feb. 18, 2021

(51) Int. Cl.
| | | |
|---|---|---|
| *A01D 87/12* | (2006.01) | |
| *A01F 29/00* | (2006.01) | |
| *A01K 5/00* | (2006.01) | |
| *B65G 47/90* | (2006.01) | |

(52) U.S. Cl.
CPC .......... *A01D 87/127* (2013.01); *A01F 29/005* (2013.01); *A01K 5/002* (2013.01); *A01D 2087/128* (2013.01); *B65G 47/908* (2013.01)

(58) Field of Classification Search
CPC ............ A01D 87/127; A01D 2087/128; A01F 29/005; A01K 5/002; B66F 9/185; B65G 47/908; B66C 1/54; B65B 69/0025; B65B 69/0008; E21B 31/20; E21B 31/18
See application file for complete search history.

(56) References Cited

U.S. PATENT DOCUMENTS

| | | | |
|---|---|---|---|
| 5,318,399 A * | 6/1994 | Marom | B65B 69/00 414/412 |
| 5,997,237 A | 12/1999 | Langenfeld et al. | |
| 7,726,716 B2 * | 6/2010 | Shuttleworth | E01H 1/1206 294/86.4 |
| 8,740,540 B2 * | 6/2014 | Daraie | B66F 9/18 414/785 |
| 2009/0108606 A1 | 4/2009 | Noonan et al. | |

(Continued)

FOREIGN PATENT DOCUMENTS

| | | |
|---|---|---|
| EP | 3335542 A1 | 6/2018 |
| WO | WO2011070037 A2 | 6/2011 |
| WO | WO-2015091377 A1 * | 6/2015 ........... A01F 29/005 |

OTHER PUBLICATIONS

European Search Report issued in counterpart application No. 20189150.4 dated Feb. 5, 2021 (02 pages).

*Primary Examiner* — Gregory W Adams (57) ABSTRACT

A wrap removal assembly includes an elongated support member extending along a central longitudinal axis and having an exterior surface. A snagging wire is disposed adjacent the exterior surface of the elongated support member and includes an active material changeable between a first shape and a second shape in response to a control signal. The snagging wire presents a catch spaced outward and away from the exterior surface when disposed in the first shape to snag the wrap material and gather the wrap material around the elongated support member. The snagging wire is positioned substantially flat against the exterior surface of the elongated support member when disposed in the second shape to release the wrap material and allow removal of the wrap material from the elongated support member.

20 Claims, 4 Drawing Sheets

(56) References Cited

U.S. PATENT DOCUMENTS

| | | | |
|---|---|---|---|
| 2010/0111647 A1* | 5/2010 | Noonan | B66F 9/18 |
| | | | 414/24.5 |
| 2013/0149082 A1* | 6/2013 | Sheedy | A01D 87/127 |
| | | | 414/412 |
| 2017/0064908 A1* | 3/2017 | Sell | A01F 29/005 |
| 2018/0016049 A1 | 1/2018 | Schmitz et al. | |

* cited by examiner

BALE WRAP REMOVAL DEVICE UTILIZING SHAPE MEMORY WIRE

TECHNICAL FIELD

The disclosure generally relates to a wrap removal assembly for removing wrap material from a bale, and a method of removing wrap material from a bale.

BACKGROUND

Round bales are formed using a baler that rolls crop material into a cylindrical bale. The crop material may include, but is not limited to, hay, grass, silage, etc. The cylindrical bale is secured into a package by wrapping the cylindrical bale with a wrap material. The wrap material may include, but is not limited to, a solid plastic wrap, a netting wrap, etc. The wrap material works well for securing the crop material and maintaining the form of the round bale. However, it should be removed before feeding the crop material to an animal.

The wrap material may be removed manually, but this is a time consuming and laborious task. Different styles of wrap removal assemblies have been developed for removing the wrap material. One example style of wrap removal assembly includes a cylindrical member having fixed fingers extending radially outward from the cylindrical member. The fixed fingers have a fixed and constant shape that is designed to snag the wrap material as the bale and the cylindrical member are rotated relative to each other. Rotation of the cylindrical member winds the wrap material around the cylindrical member while simultaneously unwinding the wrap material from the bale. The wrap material must then be removed from the cylindrical member. However, the fixed fingers become intertwined with the wrap material and do not release the wrap material easily, making removal of the wrap material from the cylindrical member difficult.

SUMMARY

A wrap removal assembly for removing wrap material disposed about a circumference of a bale of crop material is provided. The wrap removal assembly includes an elongated support member extending between a first end and a second end along a central longitudinal axis. The elongated support member includes an exterior surface. A snagging wire is at least partially disposed adjacent the exterior surface of the elongated support member. The snagging wire includes an active material changeable between a first shape and a second shape in response to a control signal. The snagging wire presents at least one catch spaced outward and away from the exterior surface relative to the central longitudinal axis when disposed in the first shape to snag the wrap material and gather the wrap material around the elongated support member. The snagging wire is positioned substantially flat against the exterior surface of the elongated support member when disposed in the second shape to release the wrap material and allow removal of the wrap material from the elongated support member.

In one aspect of the disclosure, the snagging wire forms a first effective circumference when disposed in the first shape, and a second effective circumference when disposed in the second shape. The first effective circumference is larger than the second effective circumference.

In one aspect of the disclosure, the catch includes a plurality of catches spaced longitudinal along the central longitudinal axis of the elongated support member.

In one aspect of the disclosure, the active material is a shape memory alloy, and the control signal includes an electric current that is applied to the shape memory alloy.

In one embodiment, the shape memory alloy may exhibit a two-way phase change whereby the snagging wire changes from the second shape into the first shape in response to the control signal, and automatically returns to the second shape upon the cessation of the control signal.

In another embodiment, the shape memory alloy may exhibit a one-way phase change whereby the snagging wire changes from the second shape into the first shape in response to the control signal and maintains the first shape upon the cessation of the control signal. The wrap removal assembly may further include an actuator attached to the snagging wire. The actuator is operable to apply a return force to the snagging wire to mechanically deform the snagging wire from the first shape into the second shape in the absence of the control signal. The actuator may include one of a biasing actuator, a linear actuator, or a rotary actuator.

In one aspect of the disclosure, a frame rotatably supports the elongated support member for rotation about the central longitudinal axis. As such, the elongated support member is rotatable about the central longitudinal axis. The frame is configured to rotatably support the bale in abutting engagement with the elongated support member.

In one embodiment of the disclosure, the elongated support member includes a cylindrical shape defining a circular cross section perpendicular to the central longitudinal axis. The elongated support member is tubular, and includes a wall having the exterior surface and an interior surface. The wall forms a hollow central section.

In one embodiment of the disclosure, the snagging wire extends longitudinally along the central longitudinal axis such that a first portion of the snagging wire is disposed adjacent the exterior surface of the wall, and a second portion of the snagging wire is disposed within the hollow central section adjacent the interior surface of the wall. The snagging wire may encircle the wall, or may pass through openings in the wall.

In another embodiment of the disclosure, the snagging wire is radially wrapped around the exterior surface of the elongated support member. For example, the snagging wire may be wrapped around the exterior surface of the elongated support member to form a helix.

A method of removing the wrap material from a bale of crop material is also provided. The method includes providing a wrap removal assembly having an elongated support member supporting a snagging wire against an exterior surface of the elongated support member. The snagging wire includes an active material changeable between a first shape and a second shape in response to a control signal. The snagging wire presents at least one catch spaced outward and away from the exterior surface relative to the central longitudinal axis when disposed in the first shape. The snagging wire is positioned substantially flat against the exterior surface when disposed in the second shape. The bale of crop material is positioned in the wrap removal assembly such that the wrap material is disposed against the elongated support member. The snagging wire is controlled into the first shape to form the at least one catch. The bale and the elongated support member may then be rotated relative to each other such that the at least one catch snags the wrap material and the rotation of the elongated support member winds the wrap material thereabout while simultaneously unwinding the wrap material from the bale.

In one aspect of the disclosure, the method of removing the wrap material includes controlling the snagging wire into the second shape after the wrap material is completely unwound from the bale.

In another aspect of the disclosure, the method of removing the wrap material includes removing the wrap material from the elongated support member while the snagging wire is disposed in the second shape.

Accordingly, because the snagging wire is changeable between the first shape and the second shape, the snagging wire may effectively snag and grasp the wrap material when controlled into the first shape, but may then release the wrap material when controlled into the second shape to make removal of the wrap material from the elongated support member easier.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
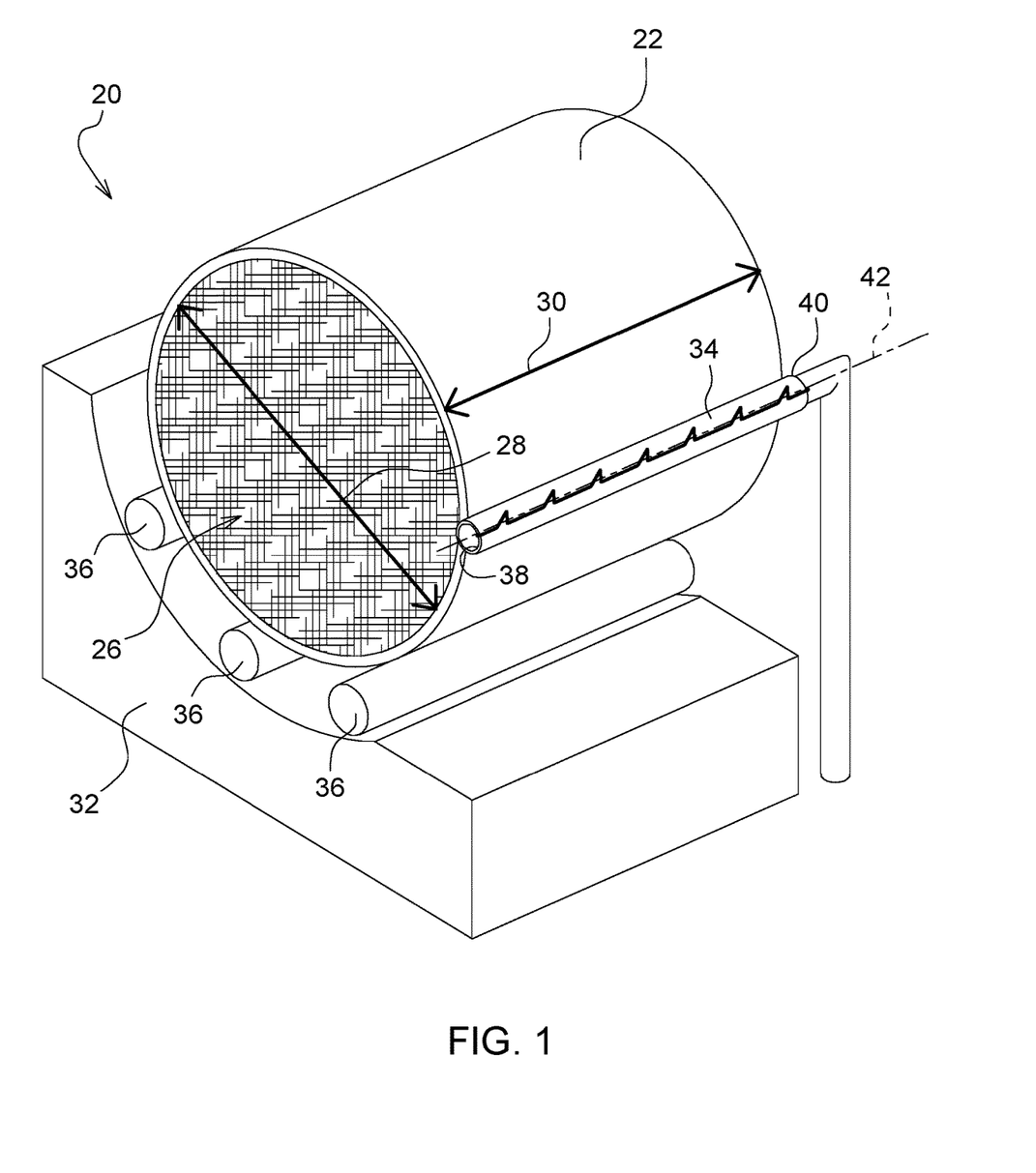
FIG. 1 is a schematic perspective view of a wrap removal assembly.

Referring to the Figures, wherein like numerals indicate like parts throughout the several views, a wrap removal assembly is generally shown at 20 in FIG. 1. Referring to FIG. 1, the wrap removal assembly 20 is configured to remove wrap material 22 disposed about a circumference of a bale 26 of crop material. The wrap material 22 may include, but is not limited to, a solid plastic wrap material, a net wrap material, or some other material suitable for wrapping the bale 26 of crop material. The crop material may include, but is not limited to, cotton, hay, grass, or some other similar bacterial that is formed into a cylindrical bale 26 for shipping and/or storage.

Referring to FIG. 1, the bale 26 of crop material includes a cylindrical bale 26 having a bale diameter 28 and a bale width 30. The bale 26 includes an outer surface, about which the wrap material 22 is wound. The wrap material 22 extends at least partially along the bale width 30. In one example embodiment, the wrap material 22 extends along the entire bale width 30 and is wrapped around the circumference of the outer surface of the cylindrical bale 26. In other examples, the wrap material 22 may extend partially or completely over the circular ends of the cylindrical bale 26.

As shown in FIG. 1, the wrap removal assembly 20 includes a frame 32 and an elongated support member 34. The frame 32 is configured to rotatably support the bale 26. The frame 32 may be shaped, sized, and/or configured in any suitable manner. The frame 32 may include one or more rollers 36 to rotatably support the bale 26. One or more of the rollers 36 may be driven to cause the bale 26 to rotate. The frame 32 is configured to rotatably support the bale 26 in abutting engagement with the elongated support member 34. It should be appreciated that the frame 32 may be configured differently than the schematic embodiment shown in the FIG. 1.

The frame 32 may rotatably support the elongated support member 34. In other embodiments, the elongated support member 34 may not be directly attached to the frame 32 and may be supported by some other structure in a position adjacent to the frame 32 to engage the bale 26 on the frame 32.

Figure 2:
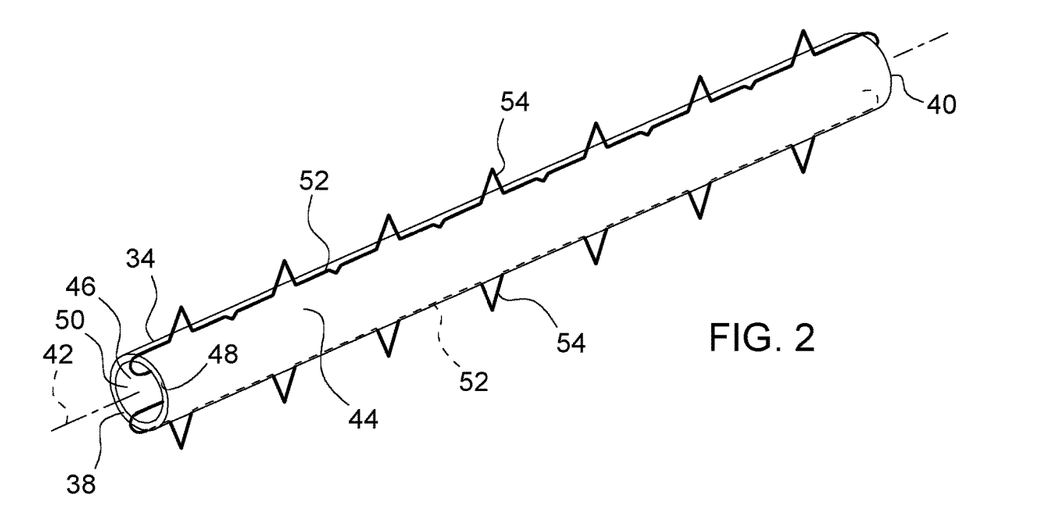
FIG. 2 is a schematic perspective view of an elongated support member of the wrap removal assembly.
Figure 3:
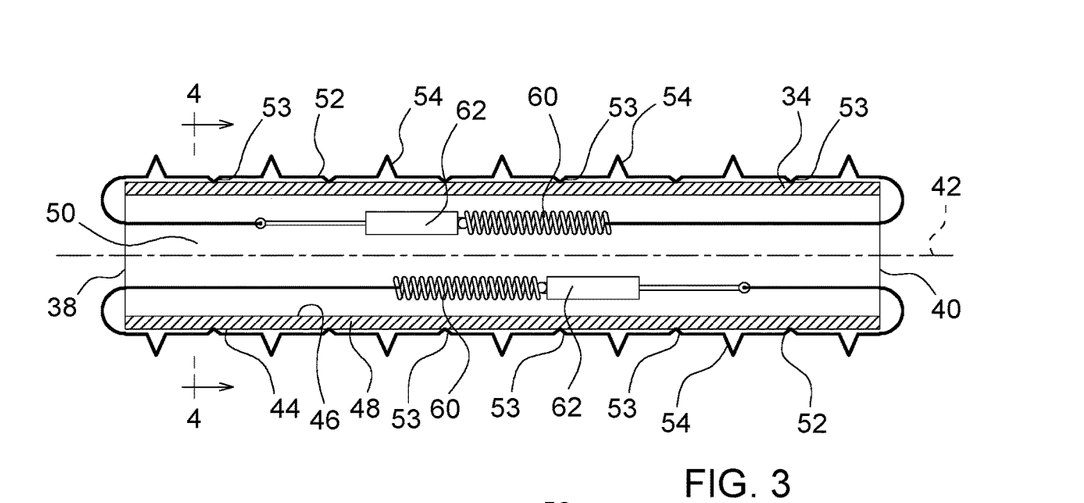
FIG. 3 is a schematic cross-sectional view of the elongated support member parallel to a central longitudinal axis of the elongated support member showing a snagging wire disposed in a first shape.

Referring to FIGS. 2 and 3, the elongated support member 34 extends between a first end 38 and a second end 40 along a central longitudinal axis 42. The elongated support member 34 is rotatable about the central longitudinal axis 42. In the example embodiment shown in the Figures and described herein, the elongated support member 34 includes a cylindrical shape defining a circular cross section (shown in FIG. 4) generally perpendicular to the central longitudinal axis 42. However, it should be appreciated that the elongated support member 34 may include some other cross sectional shape perpendicular to the central longitudinal axis 42, and that the elongated support member 34 may vary from the cylindrical shape shown and described herein. For example, the elongated support member 34 may include a conical shape that includes a variable cross-sectional size with movement along the central longitudinal axis 42, e.g., a variable diameter that narrows with respect to position along the central longitudinal axis 42.

Figure 4:
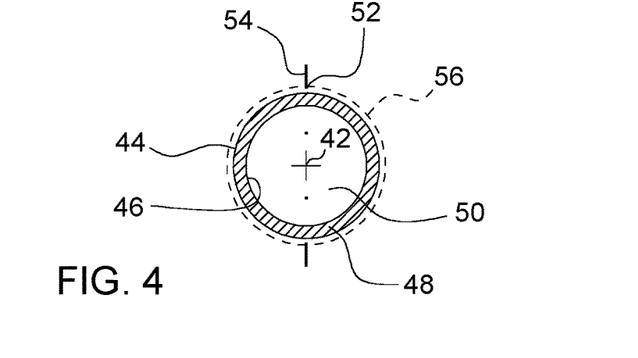
FIG. 4 is a schematic cross-sectional view of the elongated support member perpendicular to the central longitudinal axis showing the snagging wire disposed in the first shape.

In the example embodiment shown in the Figures and described herein, with reference to FIGS. 3 and 4, the elongated support member 34 is tubular, and includes a wall 48 defining an exterior surface 44 and an interior surface 46. The wall 48 forms a hollow central section 50. While the example embodiment is shown and described as being a tubular member, it should be appreciated that other embodiments of the elongated support member 34 may not be tubular, i.e., may have a solid cross section.

Figure 7:
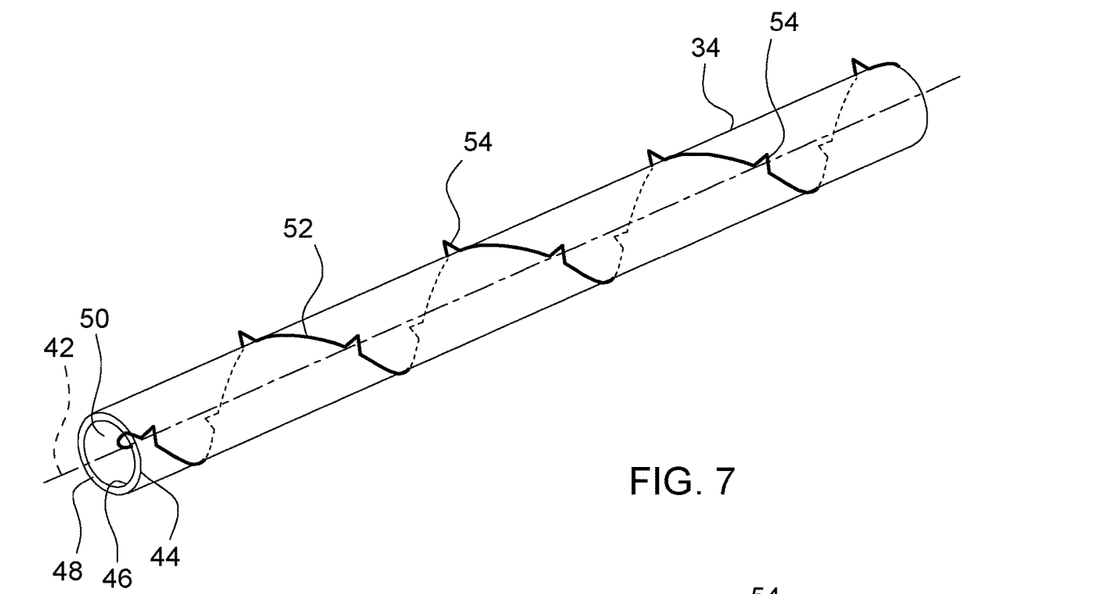
FIG. 7 is a schematic perspective view showing an alternative configuration of the snagging wire on the elongated support member.
Figure 8:
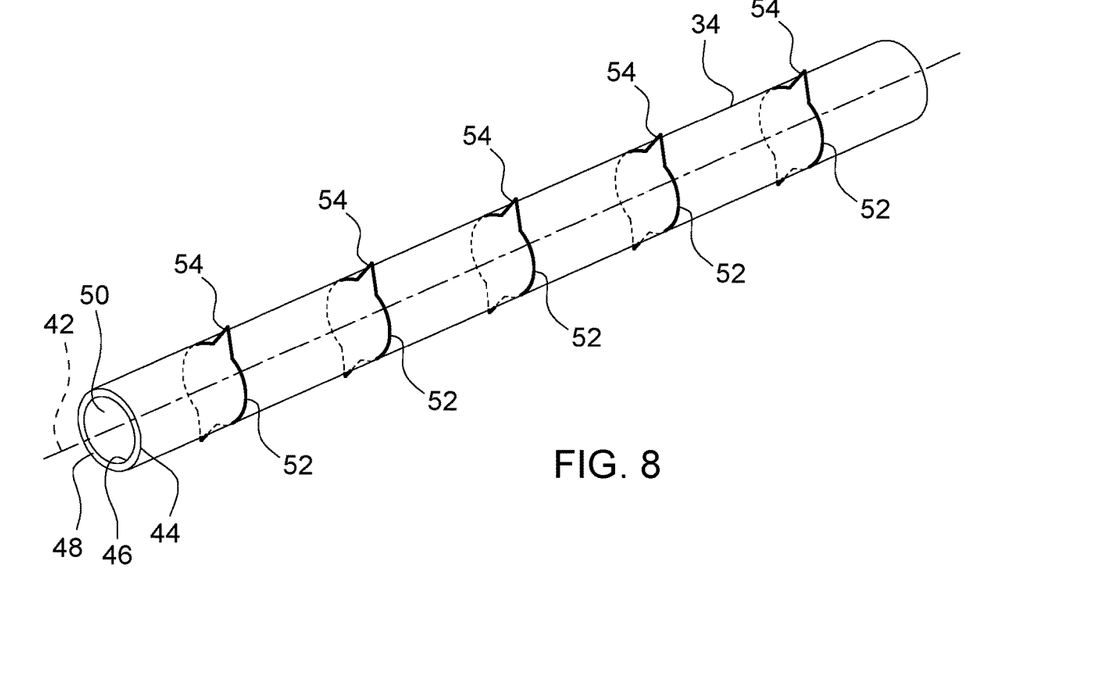
FIG. 8 is a schematic perspective view showing an alternative configuration of the snagging wire on the elongated support member.

Referring to FIG. 2, a snagging wire 52 is attached to and supported by the elongated support member 34. The snagging wire 52 is at least partially disposed adjacent the exterior surface 44 of the elongated support member 34. In the example embodiment shown in the Figures and described herein, the snagging wire 52 extends longitudinally along the central longitudinal axis 42 and encircles the wall 48 parallel to the central longitudinal axis 42, such that a first portion of the snagging wire 52 is disposed adjacent the exterior surface 44 of the wall 48, and a second portion of the snagging wire 52 is disposed within the hollow central section 50 adjacent the interior surface 46 of the wall 48. However, it should be appreciated that the snagging wire 52 may be attached to the elongated support member 34 differently than shown in the Figures and described herein. In one example, the wall 48 may include apertures or holes through which the snagging wire 52 passes through, such that the snagging wire 52 does not completely encircle the wall 48 parallel to the central; longitudinal axis 42. In another example, with reference to FIG. 7, other embodiments may include the snagging wire 52 radially wrapped around the exterior surface 44 of the elongated support member 34 to form a helix. In yet other embodiments, with reference to FIG. 8, the snagging wire 52 may be wrapped radially around the elongated support member 34 to form a circular shape perpendicular to the central longitudinal axis 42, such that the snagging wire 52 does not extend along the central longitudinal axis 42, but rather extends radially about the central longitudinal axis 42. It should be appreciated that the snagging wire 52 may be attached to the elongated support member 34 in multiple different orientations and/or configurations, and that the scope of the disclosure is not limited to the example embodiments shown and described herein.

Figure 5:
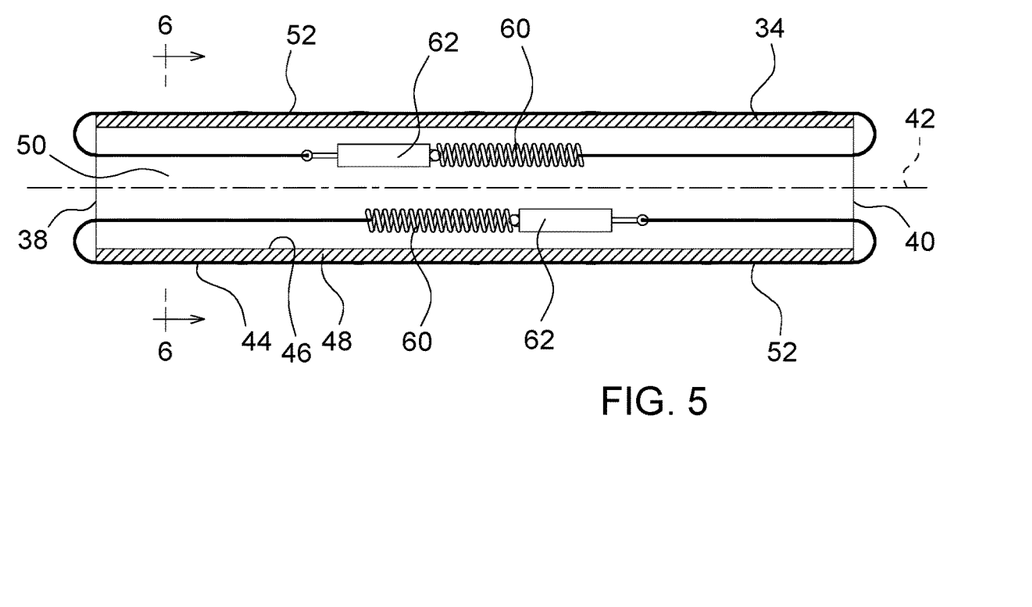
FIG. 5 is a schematic cross-sectional view of the elongated support member parallel to the central longitudinal axis showing the snagging wire disposed in a second shape.
Figure 6:
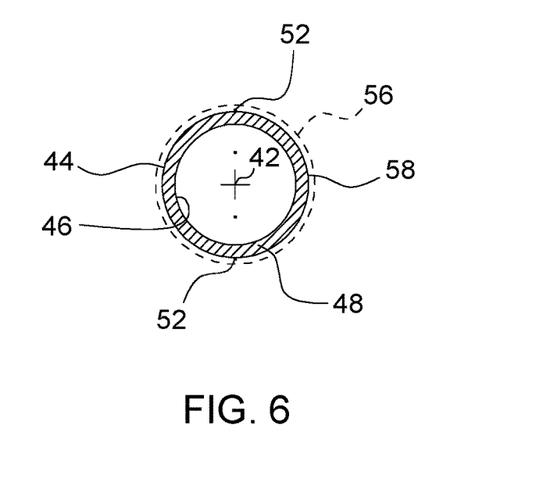
FIG. 6 is a schematic cross-sectional view of the elongated support member perpendicular to the central longitudinal axis showing the snagging wire disposed in the second shape.

Referring to FIGS. 3-6, the snagging wire 52 includes an active material that is changeable between a first shape and a second shape in response to a control signal. The first shape is generally shown in FIGS. 3 and 4. The second shape is generally shown in FIGS. 5 and 6. Referring to FIGS. 3 and 4, the snagging wire 52 presents at least one at least one standoff 53 extending toward the elongated support member 34 to space the snagging wire 52 away from the elongated support member 34, and at least one catch 54 spaced outward and away from the exterior surface 44 relative to the central longitudinal axis 42 when disposed in the first shape. The catches 54 of the first shape are configured to snag and hold onto the wrap material 22 so that the elongated support member 34 may gather the wrap material 22 around thereabout while rotating. Referring to FIGS. 5 and 6, the snagging wire 52 does not present the standoffs 53 or the catches 54 when disposed in the second shape to position the snagging wire 52 substantially flat against the exterior surface 44 and to ease release the wrap material 22 and allow removal of the wrap material 22 from the elongated support member 34. As such, the first shape of the snagging wire 52 presents the one or more standoffs 53 and the one or more catches 54 for snagging and grasping the wrap material 22, and the second shape withdraws or removes the one or more standoffs 53 and the one or more catches 54 so that the snagging wire 52 does not interfere with removal of the wrap material 22 from the elongated support member 34.

The catches 54 may exhibit a shape that is capable of grasping and holding the wrap material 22 as the elongated support member 34 rotates relative to the bale 26. The exemplary embodiment shown in the Figures shows the catches 54 having a generally hook shape. However, it should be appreciated that the catches 54 may be configured differently than shown in the Figures.

In the embodiments depicted, the active material is Shape Memory Alloy (SMA). Other active materials may be used within the scope of the disclosure. For example, the active material may include, without limitation, shape memory alloys, a shape memory polymers (SMP), or some other similar active material capable of changing between two distinct, pre-defined shapes.

Suitable shape memory alloys can exhibit a one-way shape memory effect, an intrinsic two-way shape memory effect, or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit a two-way or intrinsic shape memory effect are fabricated from a shape memory alloy composition that will automatically reform themselves upon the cessation of the control signal.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

Other suitable active materials are shape memory polymers. Similar to the behavior of a shape memory alloy, when the temperature is raised through its transition temperature, the shape memory polymer also undergoes a change in shape orientation. Dissimilar to SMAs, raising the temperature through the transition temperature causes a substantial drop in modulus. While SMAs are well suited as actuators, SMPs are better suited as "reverse" actuators. That is, by undergoing a large drop in modulus by heating the SMP past the transition temperature, release of stored energy blocked by the SMP in its low temperature high modulus form can occur. To set the permanent shape of the shape memory polymer, the polymer must be at about or above the Tg or melting point of the hard segment of the polymer. "Segment" refers to a block or sequence of polymer forming part of the shape memory polymer. The shape memory polymers are shaped at the temperature with an applied force followed by cooling to set the permanent shape. The temperature necessary to set the permanent shape is preferably between about 100° C. to about 300° C. Setting the temporary shape of the shape memory polymer requires the shape memory polymer material to be brought to a temperature at or above the Tg or transition temperature of the soft segment, but below the Tg or melting point of the hard segment. At the soft segment transition temperature (also termed "first transition temperature"), the temporary shape of the shape memory polymer is set followed by cooling of the shape memory polymer to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

Shape memory polymers may contain more than two transition temperatures. A shape memory polymer composition comprising a hard segment and two soft segments can have three transition temperatures: the highest transition temperature for the hard segment and a transition temperature for each soft segment.

Most shape memory polymers exhibit a "one-way" effect, wherein the shape memory polymer exhibits one permanent shape. Upon heating the shape memory polymer above the first transition temperature, the permanent shape is achieved and the shape will not revert back to the temporary shape without the use of outside forces. As an alternative, some shape memory polymer compositions can be prepared to exhibit a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape between the first permanent shape and the second permanent shape. Each of the permanent shapes belongs to one component of the shape memory polymer. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape") and fixing the permanent shape of component B while applying a stress to the component.

Similar to the shape memory alloy materials, the shape memory polymers can be configured in many different forms and shapes. The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., more preferably less than or equal to about 90° C., and most preferably less than or equal to about 70° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

The shape memory polymer or the shape memory alloy, may be activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

The control signal is provided by an activation device, i.e., a controller 62, and may include a heat signal, a magnetic signal, an electrical signal, a pneumatic signal, a mechanical signal, and the like, and combinations comprising at least one of the foregoing signals, with the particular control signal dependent on the materials and/or configuration of the active material. For example, an electrical current may be applied for changing the property of the active material fabricated from shape memory alloys and/or shape memory polymers.

As noted above, the active material may include a shape memory alloy that is controlled via an electric control signal. The shape memory alloy may exhibit a two-way phase change, or a one-way phase change. When the shape memory alloy exhibits the two-way phase change, the snagging wire 52 changes from the second shape into the first shape in response to the control signal, and automatically returns to the second shape upon the cessation of the control signal. When the shape memory alloy exhibits the one-way phase change, the snagging wire 52 changes from the second shape into the first shape in response to the control signal and maintains the first shape upon the cessation of the control signal. A return force is applied, e.g., via an actuator 60, to deform the snagging wire 52 back into the second shape.

As noted above, the snagging wire 52 forms at least one standoff 53 and at least one catch 54 when disposed in the first shape. In the example embodiment shown in FIGS. 2 and 3, and described herein, the at least one standoff 53 and the at least one catch 54 include a plurality of standoffs 53 and a plurality of catches 54 spaced longitudinal along the central longitudinal axis 42 of the elongated support member 34. The standoffs 53 extend inward toward the exterior surface 44 of the elongated support member 34 to space the snagging wire away from the exterior surface 44. Referring to FIG. 4, the snagging wire 52 forms a first effective circumference 56 when disposed in the first shape. As used herein, the term "effective circumference" should be understood as including a smallest possible imaginary circular shape arranged perpendicular to the central longitudinal axis 42 that surrounds the snagging wire 52. Because the standoffs 53 space the snagging wire away from the exterior surface 44 of the elongated support member 34, it should be appreciated that the first effective circumference 56 is larger than the circumference of the exterior surface 44 of the elongated support member 34. The catches 54 extend outward from the exterior surface 44 of the elongated support member 34. When the snagging wire is disposed in the first shape, the wrap material 22 is snagged by the catches 54 and wrapped generally around the first effective circumference 56 of the snagging wire 52.

As noted above, the snagging wire 52 does not present the standoffs 53 and the catches 54 when disposed in the second shape. Referring to FIG. 6, when the snagging wire 52 is disposed in the second shape, the snagging wire 52 is disposed immediately adjacent to the elongated support member 34. As such, the snagging wire 52 forms a second effective circumference 58 when disposed in the second shape, that is approximately equal to the outside circumference of the exterior surface 44 of the elongated support member 34. Because the standoffs 53 position the snagging wire 52 away from the elongated support member 34 when in the first shape, such as shown in FIG. 4, and the snagging wire 52 is positioned flat against the elongated support member 34 when in the second shape, such as shown in FIG. 6, the first effective circumference 56 is larger than the second effective circumference 58. The first effective circumference 56 is shown in FIG. 6 for reference to illustrate that the second effective circumference 58 is smaller than the first effective circumference 56, thereby easing the removal of the wrap material 22 that was wound around the first effective circumference 56 of the snagging wire 52.

It should be appreciated that if the elongated support member 34 includes a tapered shape along the central longitudinal axis 42, such as but not limited to a conical shape, then the snagging wire 52 will also exhibit a conical shape, particularly when disposed in the second shape. Such a conical shape may improve removability of the wrap material 22 from the elongates support member 34.

Referring to FIG. 3, the wrap removal assembly 20 may further include an actuator 60. The actuator 60 is attached to the snagging wire 52 and operable to apply a force to the snagging wire 52. The actuator 60 may be used with a two-way phase change shape memory alloy, or with a one-way phase change shape memory alloy. For example, if the shape memory alloy exhibits a two-way phase change, then the actuator 60 may be used to retract an excess length of the snagging wire 52 as the snagging wire 52 changes from the first shape to the second shape. The actuator 60 may release the excess length of the snagging wire 52 when the snagging wire 52 changes from the second shape to the first shape, in order to form the catches 54. If the shape memory alloy exhibits a one-way phase change, then the actuator 60 may be used to provide the mechanical return force to mechanically deform the snagging wire from the first shape into the second shape in the absence of the control signal.

The actuator 60 may include any device capable of providing a force to the snagging wire 52. For example, the actuator 60 may include one of a biasing actuator, e.g., a spring or other similar device, a linear actuator, e.g., another active material actuator, solenoid, or other device that provides linear movement, or a rotary actuator capable of rotating and/or winding up the snagging wire 52, e.g., a winch, electric motor, or other similar device. It should be appreciated that the actuator 60 may include some other device not described herein.

A method of removing wrap material 22 from a bale 26 of crop material is also provided. The method includes providing the wrap removal assembly 20 as described above. Particularly, the wrap removal assembly 20 includes the elongated support member 34 supporting the snagging wire 52 against the exterior surface 44 of the elongated support member 34. The snagging wire 52 includes the active material that is changeable between the first shape and the second shape in response to the control signal. The snagging wire 52 presents the standoff 53 and the catch 54, which is spaced outward and away from the exterior surface 44 relative to the central longitudinal axis 42, when the snagging wire 52 is disposed in the first shape. The snagging wire 52 is positioned substantially flat against the exterior surface 44 when disposed in the second shape.

The bale 26 of crop material may then be positioned in the wrap removal assembly 20, such that the wrap material 22 is disposed against the elongated support member 34. For example, the bale 26 may be placed on the rollers 36 of the wrap removal assembly 20, and the elongated support member 34 brought into abutting contact with the wrap material 22 disposed on the outer circumference of the bale 26.

The snagging wire 52 may then be controlled into the first shape to form the at least one standoff 53 at least one catch 54. The snagging wire 52 is controlled into the first shape by applying the control signal. As noted above, the snagging wire 52 may include a shape memory alloy, and the control signal may include an electric current. A controller 62 may be engaged to provide the electric current to the snagging wire 52, causing the snagging wire 52 to change into the first shape exhibiting the catches 54.

Once the snagging wire 52 is controlled to exhibit the first shape, then the bale 26 and the elongated support member 34 may be rotated relative to each other such that the catches 54 snag the wrap material 22 and the rotation of the elongated support member 34 winds the wrap material 22 thereabout while simultaneously unwinding the wrap material 22 from the bale 26. It should be appreciated that a central axis of the bale 26 and the central longitudinal axis 42 of the elongated support member 34 are generally parallel with each other. In one example embodiment, the bale 26 and the elongated support member 34 rotate in the same rotational direction. In another embodiment, the bale 26 and the elongated support member 34 rotate in opposite rotational directions.

After the wrap material 22 is completely removed or unwound from the bale 26, the snagging wire 52 may be controlled into the second shape. The snagging wire 52 may be controlled into the second shape by stopping the control signal, i.e., the cessation of the control signal. As noted above, the snagging wire 52 may include a shape memory alloy, and the control signal may include an electric current. The controller 62 may be engaged to stop the electric current to the snagging wire 52. If the snagging wire 52 exhibits a two-way phase change, then cessation of the control signal causes the snagging wire 52 to change into the second shape removing the catches 54. If the snagging wire 52 exhibits a one-way phase change, then the controller 62 may engage the actuator 60 to apply the return force to the snagging while in addition to cessation of the control signal to change the snagging wire 52 into the second shape removing the catches 54.

Once the snagging wire 52 is changed to exhibit the second shape, the wrap material 22 may then be easily removed from the elongated support member 34. With the snagging wire 52 in the second shape, the snagging wire 52 is not intertwined with or otherwise grasping the wrap material 22 wound around the elongated support member 34. Additionally, by transforming the snagging wire 52 into the second shape, the effective circumference is reduced from the first effective circumference 56 to the second effective circumference 58, thereby providing additional room to help removal of the wrap material 22 from the elongated support member 34.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A wrap removal assembly for removing wrap material disposed about a circumference of a bale of crop material, the wrap removal assembly comprising:
    an elongated support member extending between a first end and a second end along a central longitudinal axis, and including an exterior surface;
    a snagging wire at least partially disposed adjacent the exterior surface of the elongated support member;
    wherein the snagging wire includes an active material changeable between a first shape and a second shape in response to a control signal, wherein the snagging wire presents at least one catch spaced outward and away from the exterior surface relative to the central longitudinal axis when disposed in the first shape to snag the wrap material and gather the wrap material around the elongated support member, and wherein the snagging wire is positioned substantially flat against the exterior surface of the elongated support member when disposed in the second shape to release the wrap material and allow removal of the wrap material from the elongated support member.

2. The wrap removal assembly set forth in claim 1, wherein the snagging wire forms a first effective circumference when disposed in the first shape, and a second effective circumference when disposed in the second shape, with the first effective circumference larger than the second effective circumference.

3. The wrap removal assembly set forth in claim 1, wherein the active material is a shape memory alloy.

4. The wrap removal assembly set forth in claim 3, wherein the control signal includes an electric current.

5. The wrap removal assembly set forth in claim 3, wherein the shape memory alloy exhibits a two-way phase change whereby the snagging wire changes from the second shape into the first shape in response to the control signal, and automatically returns to the second shape upon the cessation of the control signal.

6. The wrap removal assembly set forth in claim 3, wherein the shape memory alloy exhibits a one-way phase change whereby the snagging wire changes from the second shape into the first shape in response to the control signal and maintains the first shape upon the cessation of the control signal.

7. The wrap removal assembly set forth in claim 6, further comprising an actuator attached to the snagging wire and operable to apply a return force to the snagging wire to mechanically deform the snagging wire from the first shape into the second shape in the absence of the control signal.

8. The wrap removal assembly set forth in claim 7, wherein the actuator includes one of a biasing actuator, a linear actuator, or a rotary actuator.

9. The wrap removal assembly set forth in claim 1, wherein the elongated support member is rotatable about the central longitudinal axis.

10. The wrap removal assembly set forth in claim 1, wherein the elongated support member includes a cylindrical shape defining a circular cross section substantially perpendicular to the central longitudinal axis.

11. The wrap removal assembly set forth in claim 1, wherein the elongated support member is tubular, and includes a wall having the exterior surface and an interior surface, and forms a hollow central section.

12. The wrap removal assembly set forth in claim 11, wherein the snagging wire extends longitudinally along the central longitudinal axis, with a first portion of the snagging wire disposed adjacent the exterior surface of the wall, and a second portion of the snagging wire disposed within the hollow central section adjacent the interior surface of the wall.

13. The wrap removal assembly set forth in claim 1, wherein the at least one catch includes a plurality of catches spaced longitudinal along the central longitudinal axis of the elongated support member.

14. The wrap removal assembly set forth in claim 1, wherein the snagging wire is radially wrapped around the exterior surface of the elongated support member.

15. The wrap removal assembly set forth in claim 14, wherein the snagging wire is wrapped around the exterior surface of the elongated support member to form a helix.

16. The wrap removal assembly set forth in claim 1, further comprising a frame rotatably supporting the elongated support member for rotation about the central longitudinal axis.

17. The wrap removal assembly set forth in claim 1, wherein the snagging wire presents at least one standoff extending toward the exterior surface relative to the central longitudinal axis when disposed in the first shape to space the snagging wire away from the elongated support member.

18. The wrap removal assembly set forth in claim 1, wherein the elongated support member includes a tapered shape having a variable cross-sectional size with movement along the central longitudinal axis.

19. A method of removing wrap material from a bale of crop material, the method comprising:
   providing a wrap removal assembly having an elongated support member supporting a snagging wire against an exterior surface of the elongated support member, wherein the snagging wire includes an active material changeable between a first shape and a second shape in response to a control signal, wherein the snagging wire presents at least one catch spaced outward and away from the exterior surface relative to the central longitudinal axis when disposed in the first shape, and wherein the snagging wire is positioned substantially flat against the exterior surface when disposed in the second shape;
   positioning the bale of crop material in the wrap removal assembly such that the wrap material is disposed against the elongated support member;
   controlling the snagging wire into the first shape to form the at least one catch; and
   rotating the bale and the elongated support member relative to each other such that the at least one catch snags the wrap material and the rotation of the elongated support member winds the wrap material thereabout while simultaneously unwinding the wrap material from the bale.

20. The method set forth in claim 19, further comprising controlling the snagging wire into the second shape after the wrap material is completely unwound from the bale.

* * * * *